United States Patent
CaveLie

(10) Patent No.: US 8,683,008 B1
(45) Date of Patent: *Mar. 25, 2014

(54) MANAGEMENT OF PRE-FETCHED MAPPING DATA INCORPORATING USER-SPECIFIED LOCATIONS

(75) Inventor: Hans-Olav CaveLie, San Francisco, CA (US)

(73) Assignee: Google Inc., Mountain View, CA (US)

( * ) Notice: Subject to any disclaimer, the term of this patent is extended or adjusted under 35 U.S.C. 154(b) by 281 days.

This patent is subject to a terminal disclaimer.

(21) Appl. No.: 13/197,979

(22) Filed: Aug. 4, 2011

(51) Int. Cl.
*G06F 15/16* (2006.01)

(52) U.S. Cl.
USPC ............... 709/217; 709/218; 709/219

(58) Field of Classification Search
USPC .......................... 709/217, 218, 219
See application file for complete search history.

(56) References Cited

U.S. PATENT DOCUMENTS

| | | |
|---|---|---|
| 4,984,279 A | 1/1991 | Kidney et al. |
| 5,345,086 A | 9/1994 | Bertram |
| 5,793,310 A | 8/1998 | Watanabe et al. |
| 6,094,685 A | 7/2000 | Greenberg et al. |
| 6,199,150 B1 | 3/2001 | Yoshikawa |
| 6,330,453 B1 | 12/2001 | Suzuki et al. |
| 6,400,690 B1 | 6/2002 | Liu et al. |
| 6,442,757 B1 | 8/2002 | Hancock et al. |
| 6,453,233 B1 | 9/2002 | Kato |
| 6,571,279 B1 | 5/2003 | Herz et al. |
| 6,853,911 B1 | 2/2005 | Sakarya |
| 7,006,820 B1 | 2/2006 | Parker et al. |
| 7,136,748 B2 | 11/2006 | Umezu et al. |
| 7,263,368 B2 | 8/2007 | Knauerhase et al. |
| 7,315,259 B2 | 1/2008 | Sacks |
| 7,327,349 B2 | 2/2008 | Robbins et al. |
| 7,464,109 B2 | 12/2008 | Modi |
| 7,502,780 B2 | 3/2009 | Thorpe |
| 7,502,876 B1 | 3/2009 | Nemirovsky et al. |
| 7,551,182 B2 | 6/2009 | Bethune et al. |
| 7,571,422 B2 | 8/2009 | Adel et al. |
| 7,577,520 B2 | 8/2009 | Nomura |
| 7,584,434 B2 | 9/2009 | Okamura |
| 7,610,147 B2 | 10/2009 | Umezu et al. |

(Continued)

OTHER PUBLICATIONS

Kirchner, et al., "A Location-aware Prefetchting Mechanism," Project work at Distributed Information Systems Laboratory LSIR, 2004, 8 pages.

(Continued)

*Primary Examiner* — Liangche A Wang
(74) *Attorney, Agent, or Firm* — Marshall, Gerstein & Borun LLP; Andrew R. Smith

(57) ABSTRACT

Map tile data for displaying graphic elements of a web-based mapping system in a mobile computing device may be pre-fetched to the device based on selection of an option to store the data at the device. A request for mapping system data may be sent from a mobile computing device to a remote mapping system via a network connection. The request may include user-specified location data. The remote mapping system may retrieve the mapping data corresponding to the user-specified location data and send it to the mobile computing device via the network connection. The mobile computing device may receive the retrieved mapping data and display a selectable option to store or not store the mapping data in a cache memory of the mobile computing device. The retrieved mapping data may then be stored at the mobile computing device in response to selection of the option to store the mapping data.

20 Claims, 5 Drawing Sheets

(56) References Cited

U.S. PATENT DOCUMENTS

| | | |
|---|---|---|
| 7,663,671 B2 | 2/2010 | Gallagher et al. |
| 7,710,421 B2 | 5/2010 | Muramatsu |
| 7,711,473 B2 | 5/2010 | Sekine et al. |
| 7,734,412 B2 | 6/2010 | Shi et al. |
| 7,739,037 B2 | 6/2010 | Sumizawa et al. |
| 7,796,837 B2 | 9/2010 | Lueck |
| 7,831,383 B2 | 11/2010 | Oohashi |
| 7,831,387 B2 | 11/2010 | Golding et al. |
| 7,839,421 B2 | 11/2010 | Bethune et al. |
| 7,873,465 B2 | 1/2011 | Geelen et al. |
| 7,920,968 B2 | 4/2011 | Chapin et al. |
| 7,925,624 B2 | 4/2011 | Vosshall et al. |
| 7,925,982 B2 | 4/2011 | Parker et al. |
| 7,962,565 B2 | 6/2011 | Coker |
| 7,974,959 B2 | 7/2011 | Sawai et al. |
| 7,975,025 B1 | 7/2011 | Szabo et al. |
| 7,983,659 B2 | 7/2011 | Shinya |
| 7,996,445 B2 | 8/2011 | Fair et al. |
| 8,005,612 B2 | 8/2011 | Asahara et al. |
| 8,010,407 B1 | 8/2011 | Santoro et al. |
| 8,014,796 B2 | 9/2011 | Boudreau et al. |
| 8,032,297 B2 | 10/2011 | Jakobson |
| 8,060,389 B2 | 11/2011 | Johnson |
| 8,078,641 B2 | 12/2011 | Mao et al. |
| 8,095,307 B2 | 1/2012 | Ebert et al. |
| 2002/0133491 A1 | 9/2002 | Sim et al. |
| 2003/0187984 A1 | 10/2003 | Banavar et al. |
| 2004/0203998 A1 | 10/2004 | Knauerhase et al. |
| 2004/0220730 A1 | 11/2004 | Chen et al. |
| 2006/0026170 A1 | 2/2006 | Kreitler et al. |
| 2006/0069749 A1 | 3/2006 | Herz et al. |
| 2006/0195256 A1 | 8/2006 | Nakamura et al. |
| 2007/0050128 A1* | 3/2007 | Lee et al. ............. 701/200 |
| 2007/0143014 A1 | 6/2007 | Sekine et al. |
| 2007/0242077 A1 | 10/2007 | Danan |
| 2007/0273558 A1 | 11/2007 | Smith et al. |
| 2007/0282915 A1 | 12/2007 | Vosshall et al. |
| 2008/0071988 A1 | 3/2008 | Schloter et al. |
| 2008/0082225 A1 | 4/2008 | Barrett |
| 2008/0102857 A1 | 5/2008 | Kim |
| 2008/0132249 A1 | 6/2008 | Hamilton |
| 2008/0177469 A1 | 7/2008 | Geelen et al. |
| 2008/0238723 A1 | 10/2008 | Fein et al. |
| 2008/0270579 A1 | 10/2008 | Herz et al. |
| 2009/0125228 A1 | 5/2009 | Dicke et al. |
| 2009/0128483 A1 | 5/2009 | Robbins et al. |
| 2009/0132163 A1 | 5/2009 | Ashley, Jr. et al. |
| 2009/0153563 A1 | 6/2009 | Tudose |
| 2009/0182500 A1 | 7/2009 | Dicke |
| 2009/0198767 A1 | 8/2009 | Jakobson et al. |
| 2009/0244095 A1 | 10/2009 | Bowman et al. |
| 2009/0281718 A1 | 11/2009 | Gibran et al. |
| 2009/0287750 A1 | 11/2009 | Banavar et al. |
| 2009/0319177 A1 | 12/2009 | Khosravy et al. |
| 2009/0319188 A1 | 12/2009 | Otto |
| 2009/0326810 A1 | 12/2009 | Callaghan et al. |
| 2010/0106397 A1 | 4/2010 | Van Essen |
| 2010/0117810 A1* | 5/2010 | Hagiwara et al. ........ 340/425.5 |
| 2010/0131186 A1 | 5/2010 | Geelen et al. |
| 2010/0179940 A1 | 7/2010 | Gilder et al. |
| 2010/0250646 A1 | 9/2010 | Dunagan et al. |
| 2010/0274899 A1 | 10/2010 | Shrivastava et al. |
| 2010/0321399 A1 | 12/2010 | Ellren et al. |
| 2010/0333085 A1 | 12/2010 | Criddle et al. |
| 2011/0054776 A1* | 3/2011 | Petrov et al. .................. 701/201 |
| 2011/0093515 A1 | 4/2011 | Albanese |
| 2011/0095993 A1 | 4/2011 | Zuverink |
| 2011/0098917 A1 | 4/2011 | LeBeau et al. |
| 2011/0098918 A1 | 4/2011 | Siliski et al. |
| 2011/0161875 A1* | 6/2011 | Kankainen .................... 715/810 |
| 2011/0213798 A1* | 9/2011 | Osuka et al. .................. 707/769 |
| 2011/0276263 A1 | 11/2011 | Shimotani et al. |
| 2011/0316854 A1 | 12/2011 | Vandrovec |
| 2012/0022786 A1 | 1/2012 | Siliski et al. |
| 2012/0022787 A1 | 1/2012 | LeBeau et al. |

OTHER PUBLICATIONS

Weber, "Mobile Map Browsers: Anticipated User Interaction for Data Pre-Fetching," Thesis, The University of Maine, Dec. 2010, 113 pages.

Reichenbacher et al., "The World in Your Pocket—Towards a Mobile Cartography," Proc. of the 20th International Cartographic Conference, 2001, 9 pages.

Piras et al., "Compact GML: merging mobile computing and mobile cartography," CRS4, Center for Advanced Studies, Research and Development in Sardinia, 2004, 20 pages.

Molina, "Aiming and Guiding Navigation with a Non-visual GPS Application," Department of Design Sciences Faculty of Engineering, Lund University, Sep. 9, 2010, 64 pages.

Office action for U.S. Appl. No. 13/244,764 dated Nov. 28, 2011.

Office action for U.S. Appl. No. 13/244,717 dated Nov. 15, 2011.

* cited by examiner

MANAGEMENT OF PRE-FETCHED MAPPING DATA INCORPORATING USER-SPECIFIED LOCATIONS

FIELD OF TECHNOLOGY

The present disclosure relates generally to management of pre-fetched digital map data and more specifically to a system and a method for cache storage pre-fetched digital map data for viewing on a mobile device based on a user's selection of locations during a search or other actions using a web-based mapping application and selection of an option to store the map data at the mobile device.

BACKGROUND

The background description provided herein is for the purpose of generally presenting the context of the disclosure. Work of the presently named applicant, to the extent it is described in this background section, as well as aspects of the description that may not otherwise qualify as prior art at the time of filing, are neither expressly nor impliedly admitted as prior art against the present disclosure.

Many mobile computing devices such as cellular phones, tablet computers, notebooks, etc., incorporate global positioning system (GPS) hardware and applications. GPS hardware and applications are useful for navigation with mobile computing devices and are often paired with mobile mapping modules. When instantiated on the device, mobile mapping modules may communicate with a GPS transmitter or other GPS hardware on the device and a backend application server of a mapping system. Using mapping data pushed or pulled from the backend mapping system, the mapping module may then render a digital map of an area around the device's current position on the mobile device. Map data is often pushed to the device from the mapping system based on the device position provided to the system from the GPS hardware via the mapping module. For example, data for graphical representations of streets, buildings, and other geographical features may be pushed to the mobile device and the mapping module running on the device may render the pushed data into images on a display screen of the device based on the current position of the device or based on a search of the mapping system using the device.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method or instructions stored on a tangible computer-readable medium for pre-fetching map tile data to a mobile computing device may be based on user-specified location data. The method and instructions may include a plurality of steps. The method and instructions may send a request for mapping system data from a mapping module of a mobile computing device to a remote mapping system via a network connection. The request may include user-specified location data. The method and instructions may also retrieve mapping system data at the remote mapping system. The mapping system data may correspond to the user-specified location data. The method and instructions may further send the retrieved mapping system data from the remote mapping system to the mobile computing device via the network connection and receive the retrieved mapping system data at the mobile computing device via the network connection. The method and instructions may then display a selectable option to store or not store the mapping system data received from the remote mapping system in a cache memory of the mobile computing device.

The method and instructions may store the received mapping system data in a cache memory at the mobile computing device in response to selection of the option to store the mapping system data. A further request for mapping system data may be sent from the mapping module of the mobile computing device to the cache memory of the mobile computing device, wherein the further request includes the user-specified location data. Further, geographic location data may be extracted from the user-specified location data, wherein the mobile computing device generated the request for mapping system data. The user-specified location data may include one or more of a location history file, a search history file, and a routing history file each including geographic location data corresponding to geographic locations where the mobile device executed the mapping module. The user-specified location data may also include one or more of a city name, an address, an airport code, or global positioning system coordinates.

A computer system for pre-fetching mapping system data to a mapping module of a mobile computing device may comprise a mapping module and a selection remote capable of execution on a mobile computing device and a remote mapping system. The mapping module may be configured to communicate with a mapping system via a network connection and include instructions to send a request for mapping system data from the mapping module to a remote mapping system via a network connection, the request including user-specified location data. The selection module may be executable by the mobile computing device to communicate with the mapping module and analyze the user-specified location data to determine geographic location data. The remote mapping system may be configured to retrieve mapping system data using the geographic location data at the remote mapping system. The mapping system data may correspond to the geographic location data and the remote mapping system may be further configured to send the retrieved mapping system data from the remote mapping system to the mapping module via the network connection. The selection module may be further executable to display a selectable option to store or not store the mapping system data sent from the remote mapping system in a cache memory of the mobile computing device.

The selection module of the computer system may be further executable to store the received mapping system data in a cache memory of the mobile computing device in response to receiving an instruction indicating selection of the option to store the mapping system data. Further, the mapping module may include further instructions to send a further request for mapping system data to the cache memory of the mobile computing device, wherein the further request includes the user-specified location data. The selection module may be further executable by the mobile computing device to extract geographic location data from the user-specified location data.

The figures depict a preferred embodiment for purposes of illustration only. One skilled in the art will readily recognize from the following discussion that alternative embodiments of the structures and methods illustrated herein may be employed without departing from the principles described herein.

DETAILED DESCRIPTION

Figure 1:
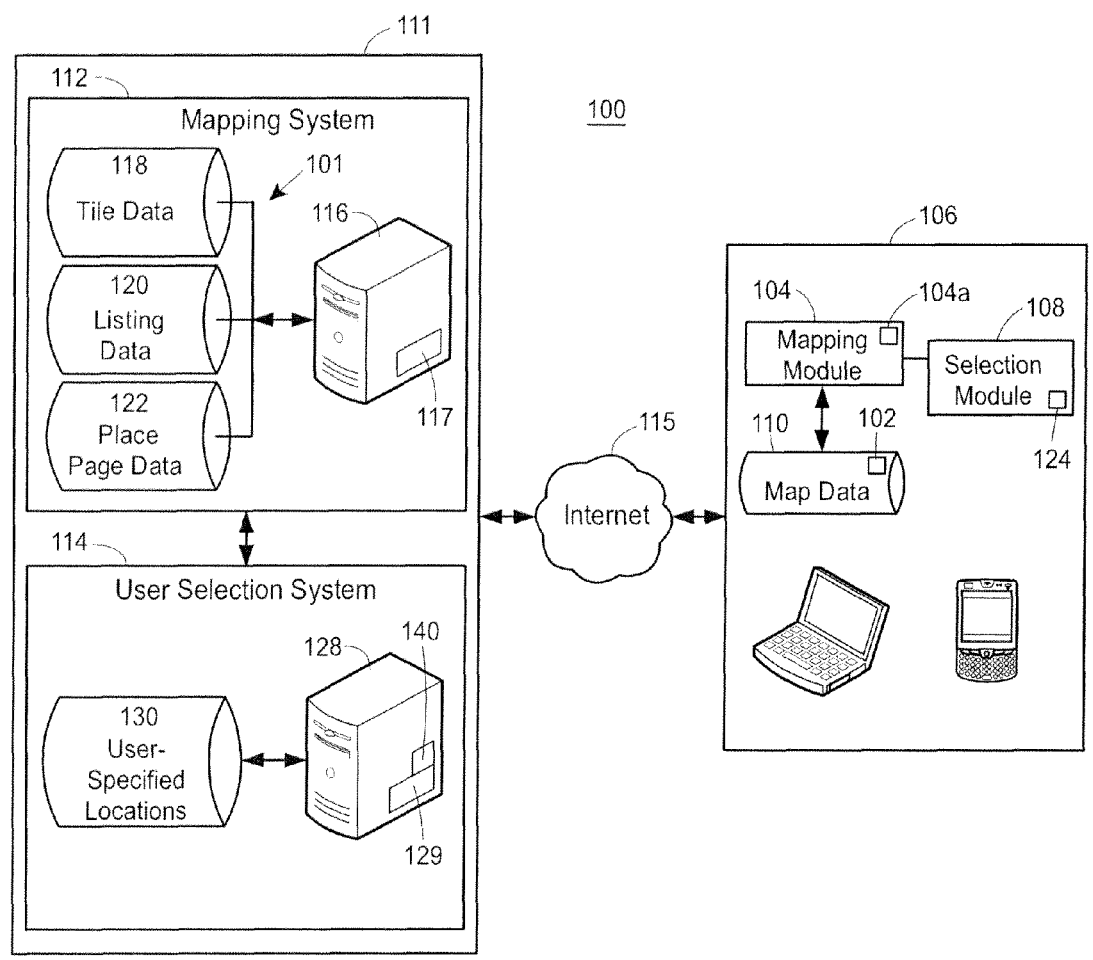
FIG. 1 is a high-level block diagram of a system for pre-fetching data for a mapping module executing on a mobile computing device based on locations specified by a user during a search or other actions with the mapping module at the mobile device.

Generally speaking, a mapping module executing on a mobile device pre-fetches digital map tile data for the mapping module. The map tile data is then stored in the mobile device for possible display to a user based on locations that a user specifies during a search or other user action taken with the mapping module. An analysis of events at the mobile device may indicate that a user's desire to pre-fetch map tile data for particular locations. Once specified, the mapping module may pre-fetch the map tile data and store the data in the memory of the mobile device. The mobile device may then quickly render a digital map using the pre-fetched map tile data for the one or more specified geographical locations without having to obtain map data from a backend mapping system. Pre-fetching the map tile data may reduce map rendering latency and lead to a better user experience. Selection of the locations for pre-fetching may be performed at the mobile computing device and may include various other types of data related to the location FIG. 1 is a high-level block diagram that illustrates a system 100 for pre-fetching mapping system data 101 including map tile data 102 for a mapping module 104 executing on a computing device 106 based on user-specified location data. The system 100 may include a computing device 106 that is capable of executing the mapping module 104, a selection module 108, and other modules that allow the device 106 to fetch or receive and store mapping system data 101, generally, and map tile 118 data, in particular, within a map data cache 110 (i.e., memory of the computing device 106 or other memory, etc.). In some embodiments, the device 106 executes instructions of the mapping module 104 and the selection module 108. The device 106 may include a personal computer, smart phone, tablet computer, or other computing device capable of executing the various modules, instructions, etc., described herein. The mapping module 104 and selection module 108 may communicate with backend components 111 including a mapping system 112 and a user selection system 114 through the Internet 115 or other type of network (e.g., LAN, a MAN, a WAN, a mobile or cellular network, a wired or wireless network, a private network, or a virtual private network, etc.).

A mapping system server 116 may send and receive data for the mapping module 104. In some embodiments, the mapping system 112 and mapping server 116 may send computer-executable instructions and data (e.g., mapping system data 101) that allows the mapping module 104 to render a digital map in a display component of the computing device 106. For example, the mapping server 116 may include a module 117 to receive geographic location data, location selections from the client computing device 106 or the user selection system 114, or other data and, in return, send mapping system data 101 (i.e., digital map tile data 118, listing data 120 corresponding to particular businesses or addresses represented within the digital map tile data 118, place page data 122 corresponding to web sites of the particular businesses or addresses of the listing data 120, etc.) to the device 106.

In some embodiments, the mapping module 104 and selection module 108 may send user-specified location data to the mapping system 112. The mapping system 112, in turn, may send mapping system data 101 to the device 106 for display. A user interface may then present an option to the user to cache the map tiles at the mobile computing device 106 that correspond to the user-specified location data. In other embodiments, the backend components 111 may retrieve user-specified location data from the mobile computing device 106 to determine which tiles to send to the device 106 for cache storage. For example, the selection module 104 may generate user-specified location data at the computing device 106 and the mapping system 112 and/or the user selection system 114 may then retrieve the user-specified location data from the device 106. The systems 112,114 may then determine the mapping system data 101 to send to the device 106, then send the data 101 to the device for cache storage.

The mapping module 104 may include computer-executable instructions to allow the computing device 106 to render a digital representation of a user's current geographic location or any other geographic location in a display component of the computing device 106. As part of the rendering process (e.g., when the user executes the mapping module 104, conducts a geographic location search using the mapping module 104, conducts a route search between two or more geographic locations using the mapping module 104, etc.), the mapping module 104 may execute instructions to display a mapping interface 104a including data 101 from the mapping system 112 (i.e., tile data 118, listing data 120, place page data 122) and/or cached map tile data 102 within a display of the computing device 106. The mapping interface 104a may allow a user to cause the device 106 to render various digital representations of geographic locations using map data 102 from the cache 110, mapping system data 101 sent from the mapping system 112, or other map data sources.

The selection module 108 may include computer-executable instructions to allow a user to select map locations 124 for pre-fetching map tile data. In some embodiments, the selection module 108 may store user-specified location data 124 while the cache 110 stores mapping system data 101 (e.g., map tile data 102) corresponding to the user-specified location data 124. In other embodiments, a variety of other modules executing on the computing device 106 or in communication with the computing device 106 (e.g., a web browser, a user mapping activity tracking module, a trip planning module, an email module, etc.) may allow a user to specify location data 124 for pre-fetching mapping system data 101.

In some embodiments, the selection module 108 at the client device 106 may receive and send user-specified location data 124 for pre-fetching map tile data 102 that is displayed at the computing device 106 using the mapping module 104. In some embodiments, the module 108 includes instructions to analyze user-specified location data 124 including a history of locations determined by GPS hardware of the computing device, mapping module search history data, routing data from routes planned between two or more geographic locations represented by the mapping module 104, or other data 136 indicating geographical locations the user has specified using the mapping module 104. The user-specified location data 124 may include geographic location data that the module 108 may send to the mapping system 112 to retrieve mapping system data 101 for cache storage.

In other embodiments, the user selection system 114 may include a user selection system server 128 at the backend 111 that includes a module 129 to receive, send, and analyze user-specified location data 124 for pre-fetching mapping system data 101 that is displayed at the computing device 106 using the mapping module 104. In some embodiments, the server 128 stores the data 124 in one or more data repositories 130. Module 129 may include computer-executable instructions to analyze the data stored in the data repository 130. Analysis of the location data 124 by the module 129 at the backend 111 may also determine location data that the mapping and event analysis system server 128 may send to the mapping system 112.

Figure 2:
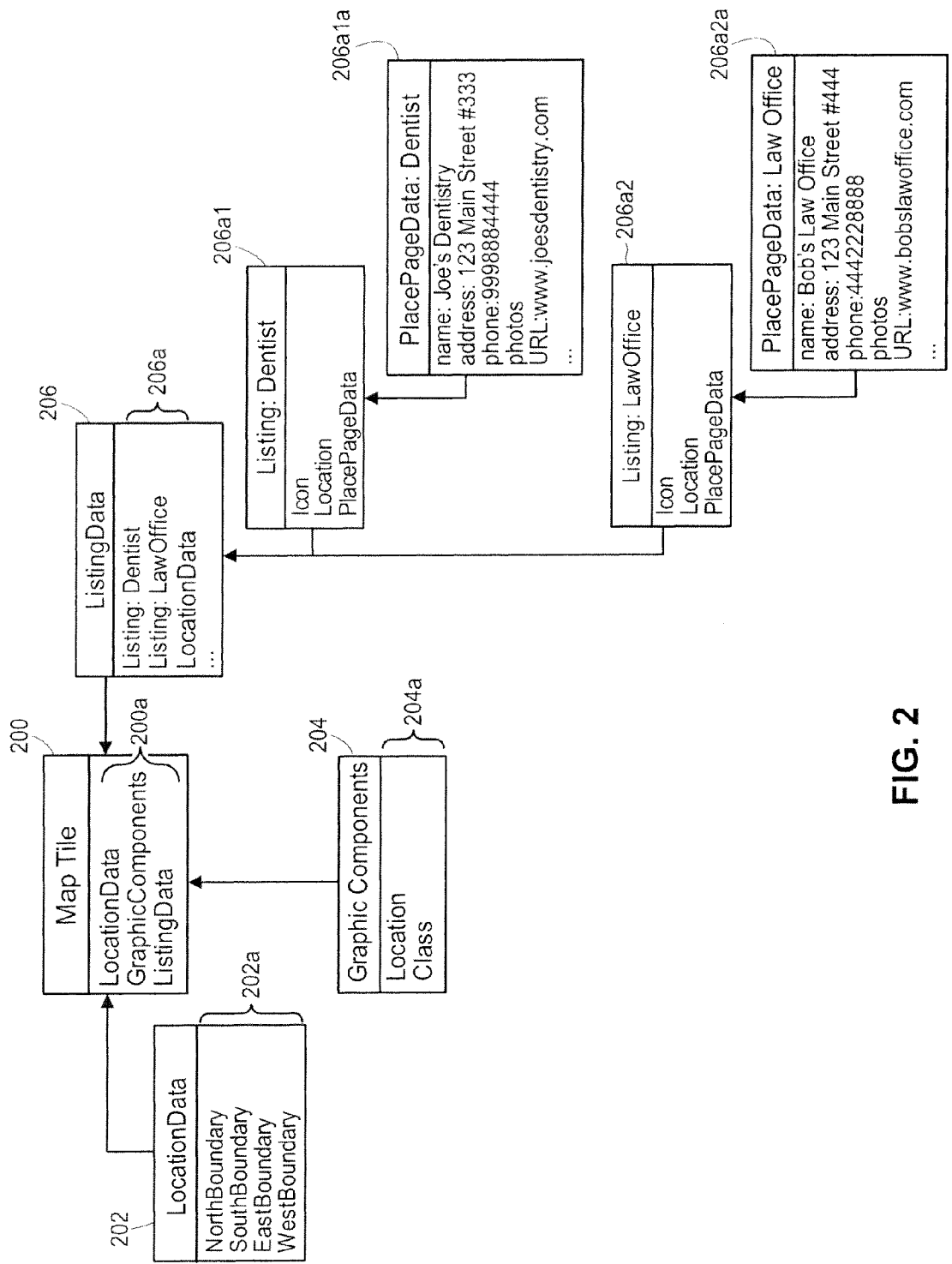
FIG. 2 is an exemplary data structure for a map tile that is pre-fetched according to user-specified locations.

FIG. 2 illustrates one embodiment of a high-level block diagram for map tile data 200. A map tile 200 may include a plurality of attributes 200a, for example, a name and graphic components 204. The map tile data 200 may also be logically linked to other data, such as, map tile location data 202 and listing data 206. The map tile location data 202 may include particular coordinates 202a that describe the specific geographic position of the map tile 200 that represents a geographic area. In some embodiments, the map tile location data 202 includes a plurality of boundaries 202a such as a north, south, east, and west boundary for the map tile 200. In other embodiments, the map tile location data 202 includes a GPS coordinate for the center of a geographic area represented by the map tile 200. The map tile location data 202 may include latitude and longitude coordinates as determined by a global positioning system (GPS) or other system that is able to determine where the physical boundary or center point is physically located. The graphic components 204 may include position and classification data 204a. In some embodiments, the position data for a graphic component 204 may include a GPS coordinate, a position within the boundaries 202a of the map tile 200, etc. The classification data for a graphic component 204 may include a type of physical object the graphic component 204 represents such as a structure, transportation item (e.g., road, rail, etc.), terrain features, and other items that graphically represent the physical objects contained within the boundaries described by the map tile location data 202 of the map tile 200. The listing data 206 may include various groups of information 206a that describe characteristics of the physical objects represented by the graphic components 204 within the map tile 200. In some embodiments, the information 206a includes listing information for businesses, points of interest, shopping centers, parks, etc., that are graphically represented within the map tile 200. The information 206a may also include specifications and other information describing the history of the object, physical specifications, etc. For example, the information 206a may include several listings 206a1, 206a2, etc., that include an icon, location, and PlacePageData 206a1a for businesses, points of interest, etc., represented by the listing data 206 within the map tile 200. PlacePageData 206a1a may include text, photos, and other data to render a web page including information from various web resources that describe a particular listing represented by a graphic component 204, icon, or other graphic item within the map tile 200.

Figure 3:
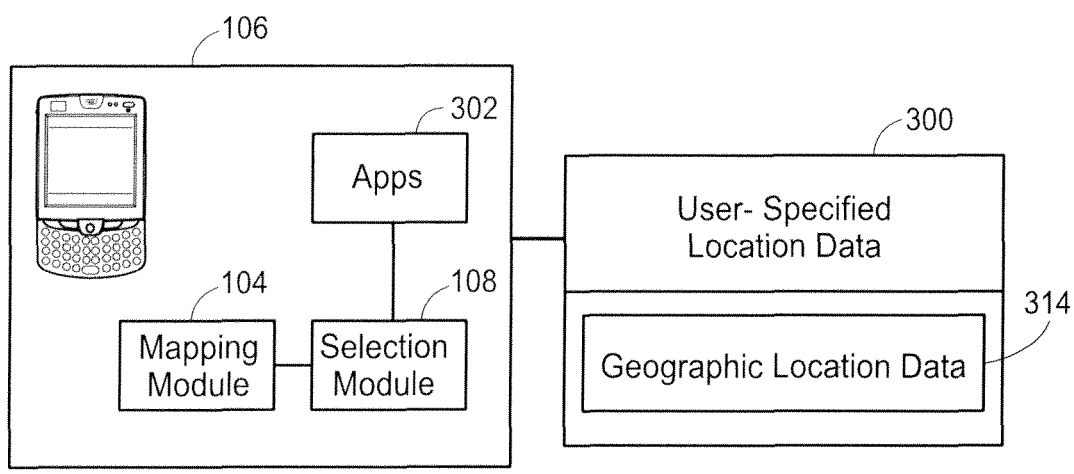
FIG. 3 is an exemplary block diagram of a mobile computing device and a data structure for user mapping module data.

FIG. 3 is a representation of user-specified location data 300 that may be used by the system 100 to pre-fetch map tile data 200 for storage within a map data cache 110 and display on a computing device 106. The user-specified location data 300 may be collected by a computing device 106 executing a selection module 108. The module 108 may be in communication with applications 302 executing on the computing device 106. In some embodiments, the applications 302 generate location data 300 by responding to user input. For example, the selection module 108 may include computer-executable instructions to cause the computing device 106 to retrieve user-specified location data 300 from the applications 302. Depending on the type of application 302, the user-specified location data 300 may be sent from the mapping module 104, a web browser, an e-mail application, social networking applications, or other applications 302. Of course, the selection module 108 may monitor any application executing on the computing device 106 for user-selected location data 300 that could be used to pre-fetch map tile data 200 for storage within a map data cache 110 and display on a computing device 106. The user-specified location data 300 may include data 314 that indicates a geographic location (i.e., geographic location data 314).

Figure 4A:
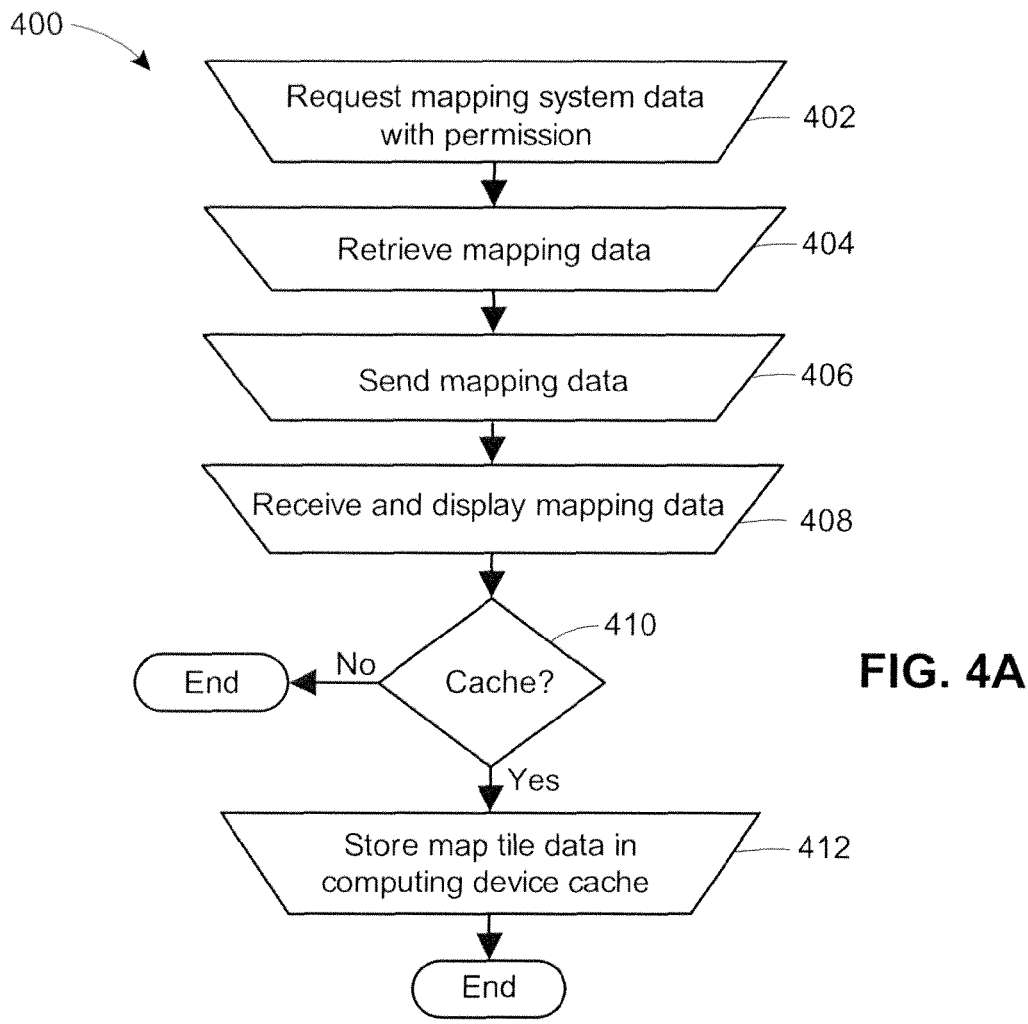
FIG. 4a is an exemplary flow chart of one method for pre-fetching map tile data for a web and cellular network-based mapping system as described herein.
Figure 4B:
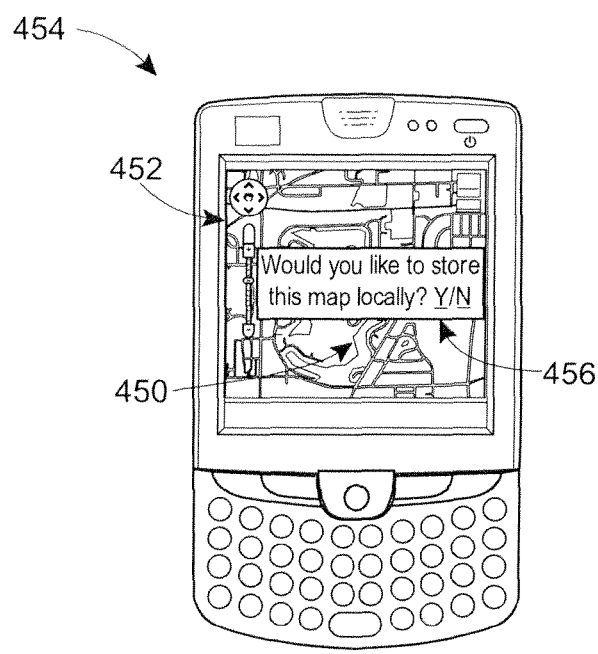
FIG. 4b is an exemplary computing device configured to display an option for pre-fetching mapping system data.

FIG. 4a is a flow diagram of an example method 400 for pre-fetching map tile data 200 for storage within a map data cache 110 and display on a computing device 106. The method 400 may include one or more blocks, modules, functions or routines in the form of computer-executable instructions that are stored in a tangible computer-readable medium and executed using a processor of a computing device (e.g., a smart phone, tablet computer, or a mobile computing device, or other personal computing device, as described herein). The method 400 may be included as part of any backend 111 or computing device 106 modules of a computing environment for a system 100 for pre-fetching map tile data 200, for example, or as part of a module that is external to such a system. The method 400 may be part of a mapping module 104 and/or a selection module 108 executing within an application on a computing device of a system 100 for pre-fetching map tile data 200 or as a module of a backend component 111. FIG. 4 will be described with reference to the Figures for ease of explanation, but the method 400 can of course be utilized with other objects and user interfaces.

At block 402, the mapping module 104 may, after receiving user permission from an opt-in or opt-out user interface, execute instructions to request mapping system data 101 from the mapping system 112. Block 402 may include instructions to present a web page or other interface on a user's computing device from which a user may choose to opt-in or opt-out of any data collection that allows or enables the computing device 106 or any other part of the system 100 to pre-fetch map tile data. The mapping module 104 may execute instructions to request mapping system data 101 from the mapping system 112. In some embodiments, the mapping module user interface 104a or other component may send a web request to the module 117 executing at a server 116 of the mapping system 112. In other embodiments, the mapping system 112 may retrieve the user-specified location data 300 from the selection module 108 or other applications 302. The web request may include user-specified location data 300 including a geographic location data 314 and other instructions. The user-specified location data 300 retrieved or sent from the mapping module 104, selection module 108, and/or applications 302 to the mapping system 112 may be part of search results using the mapping module 104 and may also include location history data, a mapping application search history, routing data, or other data from the mapping module 104. In some embodiments, the user-specified location data 300 may be retrieved from the mapping module 104 in response to a request from the selection module 108, the backend components 111 (e.g., the user selection system 114), or other modules and components of the system 100.

At block 404, the mapping system 112 may execute instructions to retrieve mapping system data 101 corresponding to the user-specified location data 300 in general and the geographic location data 314 in particular. In some embodiments, the module 117 may execute instructions to match the received user-specified location data 300 and geographic location data 314 to mapping system data 101 including a plurality of map tiles 200 that graphically represent the geographic location data 314 of the user-specified location data 300. In some embodiments, block 404 matches the received user-specified location data 300 to data within one or more of the map tile repository 118, listing data repository 120, place page data 122 repository, etc., that corresponds to the geographic location data 314 of the user-specified location data 300.

At block 406, the module 117 may execute instructions to send the mapping system data retrieved at block 404 to a mobile computing device 106. In some embodiments, block 406 sends one or more of tile data 200, listing data 206, place page data, etc., to a computing device 106. The module 117 may also send the retrieved data to a mapping module 104 executing on the computing device 106 that sent the user-specified location data 300 to the mapping system 112.

At block 408, the mapping module 104 may execute instructions to receive and display the mapping system data 101 sent from the mapping system 112 as a map 450 (FIG. 4b) within a display 452 of a mobile computing device 454. At block 410, the selection module 108 may execute instructions that cause the user interface 104a to present a user-selectable option 456 that allows caching the received mapping system data 101. If the user selects an option not to cache the received mapping system data 101, then the mapping module 104 may display the data 101 at the mobile computing device 106. If the user selects an option 456 to cache the received data 101, then the selection module 108 may execute an instruction to store the received data 101 within the mapping data cache 110 at block 412. In some embodiments, the cached data 101 is stored at block 412 so that if a user executes a search or other mapping module function that includes user-specified location data 300 and/or geographic location data 314 corresponding to cached mapping system data 101, then the mapping module 104 retrieves the cached data 101 rather than executing a web request to the mapping system 112 as described by block 402, above.

At block 408, the selection module 108 may execute instructions to determine whether to cache the mapping system data sent to the computing device 106 at block 406. In some embodiments, the module 108 may include computer-executable instructions to present an option 450 to store or not store the a user interface on a display of the mobile computing device 106. The user interface may allow the user to select and option to cache the received mapping system data 101. If the user chooses not to cache the received mapping system data, then the method 400 ends. If the user chooses to cache the received mapping system data (i.e., the map tile data 200, location data 202, listing data 206, etc.), then the module 108 may execute instructions to store the received data in the cache 110 at block 410. Once cached, the mapping module 104 may retrieve the map tile 200 and other received data for display on the mobile computing device 106 from a memory of the device 106, as described below.

Figure 5:
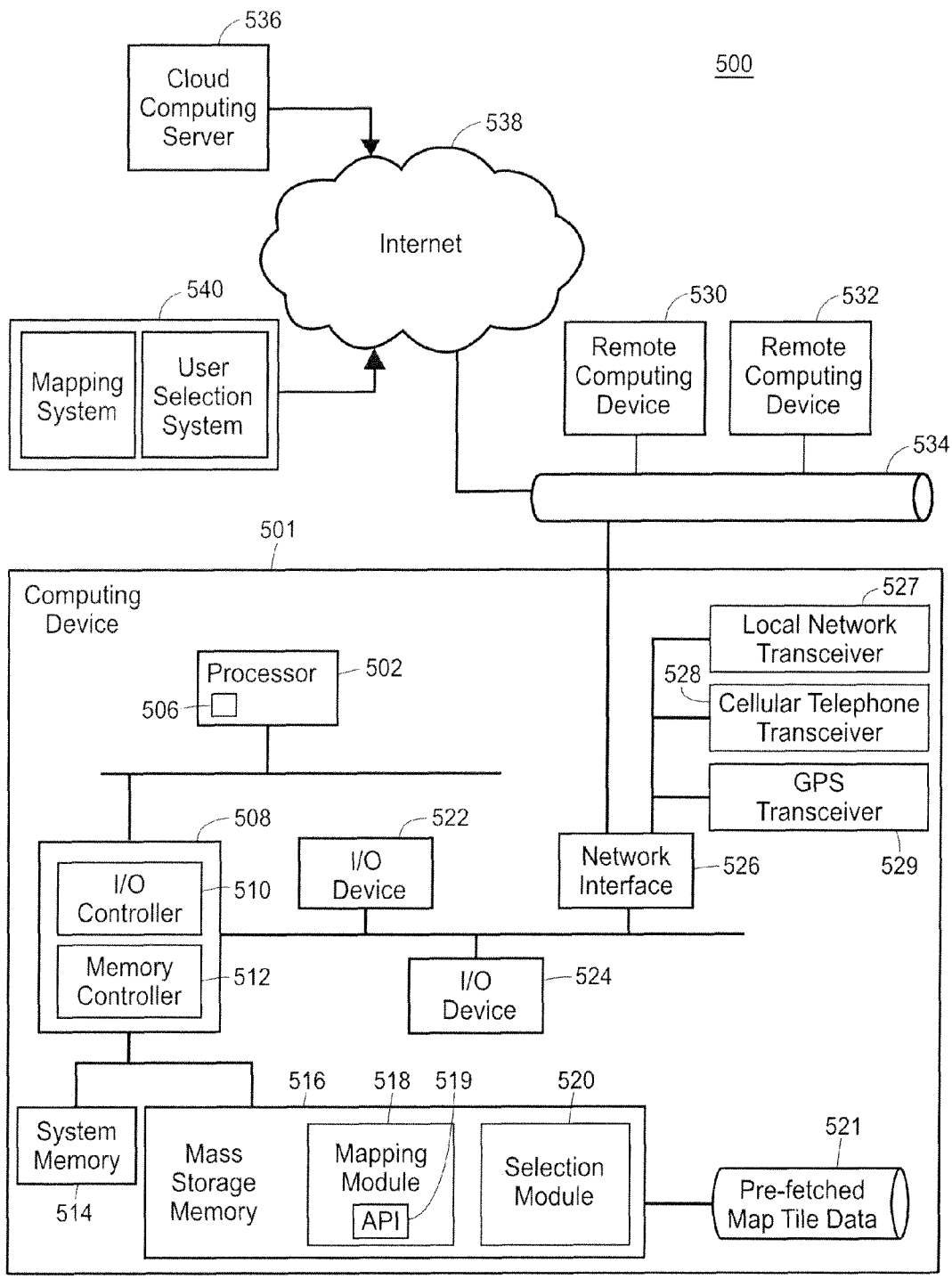
FIG. 5 is high-level block diagram of a computing environment that implements a system and method for pre-fetching data for cache storage and display on a computing device executing a mapping module.

FIG. 5 is a high-level block diagram of an example computing environment for a mobile mapping system 500 having a computing device 501 that may be used to implement the method 500 for pre-fetching map tile data 200 for storage within a map data cache 110 and display on a computing device 106. The computing device 501 may include a mobile device (e.g., a cellular phone, a tablet computers, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example mobile mapping system 500 may be used to implement and execute the example system of FIG. 1, the data structures of FIGS. 2 and 3, the method of FIG. 4, etc. Although the example mobile mapping system 500 is described below as including a plurality of peripherals, interfaces, chips, memories, etc., one or more of those elements may be omitted from other example processor systems used to implement and execute the example system 100 to pre-fetch map tile data. Also, other components may be added.

As shown in FIG. 5, the computing device 501 includes a processor 502 that is coupled to an interconnection bus 504. The processor 502 includes a register set or register space 506, which is depicted in FIG. 5 as being entirely on-chip, but which could alternatively be located entirely or partially off-chip and directly coupled to the processor 502 via dedicated electrical connections and/or via the interconnection bus 504. The processor 502 may be any suitable processor, processing unit or microprocessor. Although not shown in FIG. 5, the computing device 501 may be a multi-processor device and, thus, may include one or more additional processors that are identical or similar to the processor 502 and that are communicatively coupled to the interconnection bus 504.

The processor 502 of FIG. 5 is coupled to a chipset 508, which includes a memory controller 510 and a peripheral input/output (I/O) controller 512. As is well known, a chipset typically provides I/O and memory management functions as well as a plurality of general purpose and/or special purpose registers, timers, etc. that are accessible or used by one or more processors coupled to the chipset 508. The memory controller 510 performs functions that enable the processor 502 (or processors if there are multiple processors) to access a system memory 514 and a mass storage memory 516.

The system memory 514 may include any desired type of volatile and/or non-volatile memory such as, for example, static random access memory (SRAM), dynamic random access memory (DRAM), flash memory, read-only memory (ROM), etc. The mass storage memory 516 may include any desired type of mass storage device. For example, if the computing device 501 is used to implement a mapping module 518 having an API 519 and a selection module 520 (including instructions as described by the method 400 of FIG. 4), the mass storage memory 516 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 501 and the mobile mapping system 500. Thus, a module, block, function, operation, procedure, routine, step, and method can be implemented in hardware, firmware, and/or software. In one embodiment, program modules and routines (e.g., the mapping module 518, the API 519, the selection module 520, etc.) are stored in mass storage memory 516, loaded into system memory 514, and executed by a processor 502 or can be provided from computer program products that are stored in tangible computer-readable storage mediums (e.g. RAM, hard disk, optical/magnetic media, etc.). Mass storage 516 may also include a database 521 storing GPS data, graphics, map tile data, and other data for use by the mapping module 518 and selection module 520 as well as a database interface module through which the mapping module 518, the API 519, the selection module 520, etc., may access the GPS data, graphics, etc. received from a mapping data server 116, user selection system 114, or other system.

The peripheral I/O controller 510 performs functions that enable the processor 502 to communicate with peripheral input/output (I/O) devices 522 and 524, a network interface 526, a cellular network transceiver 527, a local network transceiver 528, and a GPS transceiver 529 (via the network interface 526) via a peripheral I/O bus 528. The I/O devices 522 and 524 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The I/O devices 522 and 524 may be used with the mapping module 518 and selection module 520 to receive GPS data from the GPS transceiver 529, send the GPS data to the backend components of the system 100, render, and display maps and user interfaces as described in relation to the figures. A cellular telephone transceiver 527 may be resident with the local network transceiver 528. The local network transceiver 528 may include support for a Wi-Fi network, Bluetooth, Infrared, or other wireless data transmission protocols. In other embodiments, one element may simultaneously support each of the various wireless protocols employed by the computing device 501. For example, a software-defined radio may be able to support multiple protocols via downloadable instructions. In operation, the computing device 501 may be able to periodically poll for visible wireless network transmitters (both cellular and local network) on a periodic basis. Such polling may be possible even while normal wireless traffic is being supported on the computing device 501. The network interface 528 may be, for example, an Ethernet device, an asynchronous transfer mode (ATM) device, an 802.11 wireless interface device, a DSL modem, a cable modem, a cellular modem, etc., that enables the system 100 for pre-fetching map tile data to communicate with another computer system having at least the elements described in relation to the system 100.

While the memory controller 512 and the I/O controller 510 are depicted in FIG. 5 as separate functional blocks within the chipset 508, the functions performed by these blocks may be integrated within a single integrated circuit or may be implemented using two or more separate integrated circuits. The mobile mapping system 500 may also implement the mapping module 518 and selection module 520 on remote computing devices 530 and 532. The remote computing devices 530 and 532 may communicate with the computing device 501 over an Ethernet link 534. For example, the computing device 501 may receive mapping data 101 created by a mapping module executing on a remote computing device 530, 532. In some embodiments, the mapping module 518 and/or the selection module 520 may be retrieved by the computing device 501 from a cloud computing server 536 via the Internet 538. When using the cloud computing server 536, the retrieved mapping module 518 and/or the selection module 520 may be programmatically linked with the computing device 501. The mapping module 518 and/or the selection module 520 may be a Java® applet executing within a Java® Virtual Machine/JVM) environment resident in the computing device 501 or the remote computing devices 530, 532. The mapping module 518 and/or the selection module 520 may also be "plug-ins" adapted to execute in a web-browser located on the computing devices 501, 530, and 532. In some embodiments, the mapping module 518 and/or the selection module 520 may communicate with back end components 540 such as the mapping system 112 and user selection system 114 via the Internet 538.

Using the systems and procedures described above, the system for pre-fetching mapping data 101 and the mapping system 500 can present an option for the user to select which causes the system to execute instructions to store the mapping data 101 in a cache memory of a mobile computing device. Using the user-specified location data, the systems and procedures described herein may retrieve mapping system data and display this data at the mobile computing device. The user may then be provided with an option to store the mapping system data at the device. Thus, when the mapping module 106 is used to request the same mapping system data that is now stored in the cache memory of the device, the module 106 may access the data from a cache memory 110, 521 rather than backend components 111, 540. Of course, the systems described herein may present a user with a user interface from which the user is able to opt-in or opt-out of any of the pre-fetching methods described herein to preserve user privacy.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

For example, the system 500 may include but is not limited to any combination of a LAN, a MAN, a WAN, a mobile, a wired or wireless network, a private network, or a virtual private network. Moreover, while only three remote computing devices 530 and 532 are illustrated in FIG. 5 to simplify and clarify the description, it is understood that any number of client computers are supported and can be in communication within the system 500.

Additionally, certain embodiments are described herein as including logic or a number of components, modules, or mechanisms. Modules may constitute either software modules (e.g., code embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled,"

however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description should be read to include one or at least one and the singular also includes the plural unless it is obvious that it is meant otherwise.

Still further, the figures depict preferred embodiments of a map editor system for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for a system and a process for cache storage of pre-fetched digital map data for viewing on a mobile device based on a user's selection of locations during a search or other actions using a web-based mapping application and selection of an option to store the map data at the mobile device through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A computer-implemented method for pre-fetching map tile data to a mobile computing device based on user-specified location data, the method comprising:
    sending a request for mapping system data from a mapping module of a mobile computing device to a remote mapping system via a network connection, wherein the request includes location data;
    retrieving mapping system data at the remote mapping system, wherein the mapping system data corresponds to the location data;
    sending the retrieved mapping system data from the remote mapping system to the mobile computing device via the network connection;
    receiving the retrieved mapping system data at the mobile computing device via the network connection;
    displaying a selectable option to store the retrieved mapping system data in a cache memory of the mobile computing device; and
    subsequently retrieving the retrieved mapping system data from the cache memory.

2. The computer-implemented method of claim 1, further comprising storing the received mapping system data at the mobile computing device in response to selection of the option to store the mapping system data.

3. The computer-implemented method of claim 2, wherein the received mapping system data is stored in a cache memory of the mobile computing device in response to selection of an option to store the mapping system data.

4. The computer-implemented method of claim 2, further comprising sending a further request for mapping system data from the mapping module of the mobile computing device to the cache memory of the mobile computing device.

5. The computer-implemented method of claim 4, wherein the further request includes the location data.

6. The computer-implemented method of claim 1, further comprising extracting geographic location data from the location data, wherein the mobile computing device generated the request for mapping system data.

7. The computer-implemented method of claim 1, wherein the location data includes a location history file including geographic location data corresponding to geographic locations where the mobile device executed the mapping module.

8. The computer-implemented method of claim 1, wherein the location data includes a search history file including geographic location data corresponding to searches conducted using the mapping module.

9. The computer-implemented method of claim 1, wherein the location data includes a routing history file including geographic location data corresponding to routes between geographic locations represented by the mapping module.

10. The computer-implemented method of claim 1, wherein the location data includes one or more of a city name, an address, an airport code, or global positioning system coordinates.

11. A non-transitory computer-readable storage medium storing instructions for pre-fetching mapping system data to a mapping module of a mobile computing device, the instructions when executed by a processor cause the processor to:
    send a request for mapping system data from the mapping module of the mobile computing device to a remote mapping system via a network connection, wherein the request includes location data;
    retrieve mapping system data at the remote mapping system, wherein the mapping system data corresponds to the location data;
    send the retrieved mapping system data from the remote mapping system to the mobile computing device via the network connection;
    receive the retrieved mapping system data at the mobile computing device via the network connection;
    display a selectable option to store the retrieved mapping system data in a cache memory of the mobile computing device;
    subsequently retrieve the retrieved mapping system data from the cache memory.

12. The non-transitory computer-readable storage medium of claim 11, further comprising instructions to store the received mapping system data in a cache memory of the mobile computing device in response to selection of an option to store the mapping system data.

13. The non-transitory computer-readable storage medium of claim 11, further comprising instructions to send a further request for mapping system data from the mapping module of the mobile computing device to the cache memory of the mobile computing device, wherein the further request includes the location data.

14. The non-transitory computer-readable storage medium of claim 11, further comprising instructions to extract geographic location data from the location data, wherein the mobile computing device generated the request for mapping system data.

15. The non-transitory computer-readable storage medium of claim 11, wherein the location data includes one or more of a location history file, a search history file, and a routing history file each including geographic location data corresponding to geographic locations where the mobile device executed the mapping module.

16. A computer system for pre-fetching mapping system data to a mapping module of a mobile computing device, the system comprising:
one or more processors;
one or more memories storing a plurality of modules including instructions for execution on the one or more processors, the modules including:
a mapping module including instructions executed on the one or more processors to communicate with a mapping system via a network connection, the mapping module including instructions to send a request for mapping system data from the mapping module to a remote mapping system via a network connection, the request including location data; and
a selection module including instructions executed on the one or more processors to communicate with the mapping module and to analyze the location data to determine geographic location data;
a remote mapping system including a processor and a memory, the memory storing instructions executed on the processor to:
retrieve mapping system data using the geographic location data at the remote mapping system, and
send the retrieved mapping system data from the remote mapping system to the mapping module via the network connection;
wherein the selection module includes further instructions to display a selectable option to store the retrieved mapping system data in a cache memory of the mobile computing device, and the mapping module is further executable to subsequently retrieve the stored mapping system data from the cache memory.

17. The computer system of claim 16, wherein the selection module includes further instructions executed on the one or more processors to store the received mapping system data in a cache memory of the mobile computing device in response to receiving an instruction indicating selection of an option to store the mapping system data.

18. The computer system of claim 16, wherein the mapping module includes further instructions executed on the one or more processors to send a further request for mapping system data to the cache memory of the mobile computing device, wherein the further request includes the location data.

19. The computer system of claim 16, wherein the selection module includes further instructions executed on the one or more processors to extract geographic location data from the location data.

20. The computer system of claim 16, wherein the location data includes one or more of a location history file, a search history file, a routing history file each including geographic location data corresponding to geographic locations where the mobile computing device executed the mapping module.

* * * * *